United States Patent
Li et al.

(10) Patent No.: US 11,411,516 B2
(45) Date of Patent: Aug. 9, 2022

(54) DETECTION AND CONTROL OF ELECTRIC MACHINE WITH ANY COMBINATION OF POSITION SENSOR NUMBER OF POLE PAIRS AND ELECTRIC MACHINE NUMBER OF POLE PAIRS

(71) Applicant: Ford Global Technologies, LLC, Dearborn, MI (US)

(72) Inventors: Silong Li, Canton, MI (US); Jiyao Wang, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 16/808,681

(22) Filed: Mar. 4, 2020

(65) Prior Publication Data

US 2021/0281199 A1 Sep. 9, 2021

(51) Int. Cl.
| | |
|---|---|
| *H02P 6/17* | (2016.01) |
| *G01B 7/30* | (2006.01) |
| *H02K 11/33* | (2016.01) |
| *H02K 11/21* | (2016.01) |
| *H02K 7/00* | (2006.01) |

(52) U.S. Cl.
CPC ............... *H02P 6/17* (2016.02); *G01B 7/30* (2013.01); *H02K 7/006* (2013.01); *H02K 11/21* (2016.01); *H02K 11/33* (2016.01); *H02P 2209/07* (2013.01)

(58) Field of Classification Search
CPC ........... H02P 6/17; H02K 11/21; H02K 11/33; H02K 7/006; G01B 7/30
See application file for complete search history.

(56) References Cited

U.S. PATENT DOCUMENTS

| | | | |
|---|---|---|---|
| 7,049,776 B2 | 5/2006 | Hornberger et al. | |
| 2003/0033064 A1* | 2/2003 | Amberkar | B62D 15/0235 180/443 |
| 2007/0051554 A1* | 3/2007 | Thacher | B60T 8/1755 180/445 |
| 2019/0033818 A1* | 1/2019 | Kondou | G05B 19/19 |

FOREIGN PATENT DOCUMENTS

| | | |
|---|---|---|
| CN | 201860242 U | 6/2011 |
| WO | 2000004339 A1 | 1/2000 |

* cited by examiner

*Primary Examiner* — Zoheb S Imtiaz
(74) *Attorney, Agent, or Firm* — David B. Kelley; Brooks Kushman P.C.

(57) ABSTRACT

A vehicle includes an electric machine having a number of pole pairs, N, a position sensor having a number of pole pairs, M, that generates output indicative of a rotational position of the electric machine, and one or more controllers. The one or more controllers generate a remapped rotational position according to a product of the rotational position and L/N, generate a scaled position according to a product of the remapped rotational position and N/M, and command the electric machine to produce a specified torque or speed based on the scaled position. M is not equal to and not a factor of N, and L is a minimum common multiplier of N and M.

10 Claims, 6 Drawing Sheets

DETECTION AND CONTROL OF ELECTRIC MACHINE WITH ANY COMBINATION OF POSITION SENSOR NUMBER OF POLE PAIRS AND ELECTRIC MACHINE NUMBER OF POLE PAIRS

TECHNICAL FIELD

This disclosure relates to automotive power electronics components.

BACKGROUND

An electrified vehicle may contain one or more motors for propulsion. It may also contain a traction battery to provide energy for the motors and an auxiliary battery to support low voltage loads. As the motor, traction battery, and auxiliary battery may require different electrical parameters, electrical communication between them may require modification of the power provided or consumed.

SUMMARY

A vehicle includes an electric machine, a position sensor, and one or more controllers. The electric machine has a number of pole pairs, N. The position sensor has a number of pole pairs, M, and generates output indicative of a rotational position of the electric machine. The one or more controllers generate a remapped rotational position according to a product of the rotational position and L/N, generate a scaled position according to a product of the remapped rotational position and N/M, and command the electric machine to produce a specified torque or speed based on the scaled position. M is not equal to and not a factor of N, and L is a minimum common multiplier of N and M.

A method for operating an electric machine of a vehicle includes obtaining a rotational position of an electric machine having a number of pole pairs, N, from a position sensor having a number of pole pairs, M, generating a remapped rotational position according to a product of the rotational position and L/N, generating a scaled position according to a product of the remapped rotational position and N/M, and commanding the electric machine to produce a specified torque or speed based on the scaled position. L is a minimum common multiplier of N and M.

An electric drive system includes an electric machine having a number of pole pairs, N, a position sensor having a number of pole pairs, M, that generates output indicative of a rotational position of the electric machine, and one or more controllers. The one or more controllers generate a count based on the output, generate a remapped rotational position according to a product of the rotational position and L/N, generate a scaled position according to a product of the remapped rotational position and N/M, reset the count to zero and reset the rotational position to zero responsive to the count plus one being greater than (L/N)−1, and command the electric machine to produce a specified torque or speed based on the scaled position.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

To control an electric machine, it typically needs a position sensor to measure the orientation of the rotor. The position sensor can be, for example, a resolver. Conventionally, the number of pole pairs (NPP), i.e., the number of lobes, of the position sensor should match the NPP of the electric machine, or at least, should be a factor of the NPP of the electric machine. If the NPP of the position sensor is not equal to nor a factor of the NPP of the electric machine, it may result in control instability and incorrect torque delivery. For example, if the NPP of the electric machine is four, it is possible to use a position sensor with an NPP of two or four. A position sensor with an NPP of one is not used as it is mechanically unbalanced and thus cannot rotate smoothly.

For some electric machine designs, the NPP is an uncommon number, for example, a prime number of five or seven. Choosing a position sensor with an NPP of five or seven may increase cost because these NPPs are relatively rare compared to other common NPPs such as two, three, four, or six.

Figure 1:
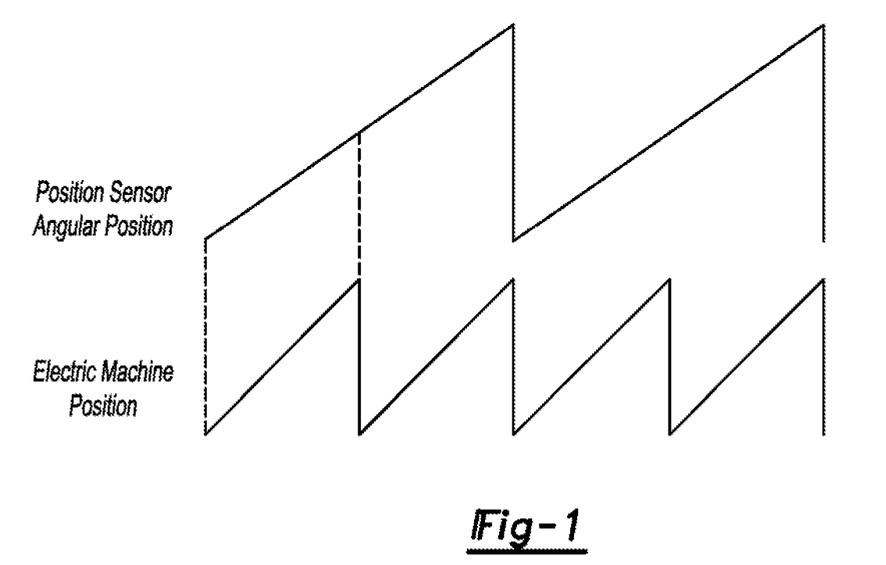
FIG. 1 shows angular position waveforms versus time for a position sensor with two pole pairs and a rotor of an electric machine with four pole pairs.

As mentioned above, the NPP of the position sensor typically needs to be equal to or a factor of the NPP of the electric machine because it permits the mapping of the position sensor measurement reading to a unique rotor position. For example, FIG. 1 shows waveforms for a position sensor with an NPP of two and electric machine with an NPP of four. For any given sensor angular position minimum or maximum reading, there is only one corresponding unique electric machine angular position reading: Whenever the angular position of the sensor waveform is zero, the angular position of the electric machine waveform likewise is zero. As such, the angular position of the electric machine is necessarily known when the when the angular position of the sensor waveform is at zero.

Figure 2:
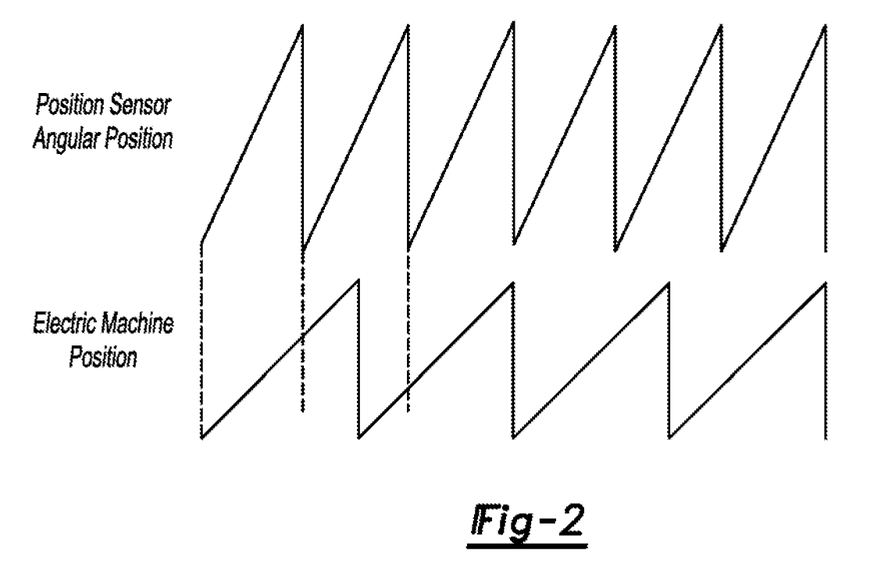
FIG. 2 shows angular position waveforms versus time for a position sensor with six pole pairs and a rotor of an electric machine with for pole pairs.

When the above relationship is not true, a position sensor reading can map to one of several possible electric machine positions. FIG. 2 shows an example of a position sensor with an NPP of six and electric machine with an NPP of four. When the position sensor reads zero (unified), the electric machine could be either zero, one-third, or two-thirds (unified). That is, conventional electric machine control algorithms cannot know the actual rotor position when the NPP of the sensor is not equal to or a factor of the NPP of the electric machine. Consequently, it may lose control and result in incorrect torque and instability.

Here, control techniques are proposed for electric machine drive systems that can operate effectively with a position sensor that has any NPP.

To control an electric machine correctly with any combination of position sensor NPP and electric machine NPP, two issues may need to be addressed. First, for each controller power up, the position sensor offset value needs to be determined, since it is not a unique value due to the lack of one-to-one mapping mentioned above. Second, a position reading during normal operation needs to be remapped to an electric machine position to restore the one-to-one mapping.

Position Sensor Offset

With regard to the first issue, any position sensor offset detection algorithm may be used. In one example, resolver offset detection is implemented by introducing a high frequency voltage signal into the electric machine. For this high frequency voltage signal and with reference to Eq. (1), a persistent rotating high frequency voltage vector $V_{dqs}^{s}$, in the stationary reference frame is injected into the electric machine:

$$V_{dqs}^{s} = V_c e^{j\omega_c t} \quad (1)$$

where $V_c$ represents the amplitude of the rotating voltage vector, and $\omega_c$ represents the frequency of the rotating voltage vector. The three-phase currents from the electric machine response are then observed and post-processed for rotor position detection. The detected rotor position is then compared with a resolver reading to determine the resolver offset value accordingly.

The injection frequency is chosen based on the inverter switching frequency. A ratio of approximately ten to twenty between the switching frequency and injection frequency are example optimized values. The selection of amplitude $V_c$ is described later.

The high frequency current response, $I_{dqs}^{s}$, has the saliency information embedded therein and can be represented by Eq. (2):

$$I_{dqs}^{s} = I_{cp} e^{j(\omega_c t + \varphi_{cp})} + I_{cn} e^{j(-\omega_c t + \varphi_{cn})} \quad (2)$$

where $I_{cp}$ and $I_{cn}$ represent the magnitude of the positive and negative sequence current response respectively, and $\varphi_{cp}$ and $\varphi_{cn}$ represent the phase of the positive and negative sequence current response respectively.

The phase the of negative sequence current response, $\varphi_{cn}$, is represented by Eq. (3)

$$\varphi_{cn} = 2\theta_e - \frac{\pi}{2} \quad (3)$$

where $\theta_e$ is the rotor position in electric degrees. It includes the electric machine rotor position information, and as consequence can be used for rotor position and resolver offset detection.

With reference to Eq. (4), the phase of the negative sequence current response, $X_k$, can be estimated by applying the discrete Fourier transform (DFT) to the three-phase current:

$$X_k = X_k = \sum_{n=0}^{N-1} x_n e^{-j2\pi f_c T_s} \quad (4)$$

where N is the number of samples of the discrete Fourier transform (the more samples taken, the more accurate the DFT results; more samples, however, require more calculation time that can delay the detection), $x_n$ is the sampled high frequency current complex vector, $I_{qds}$, and $f_c$ is the frequency of the injected signal (for the positive sequence, the sign is positive; for the negative sequence, the sign is negative).

In real applications, deadtime and nonlinearity exist in inverter systems. Inverter deadtime, $V_{dead}$, will lead to errors in actual output voltage of the inverter. As a consequence, the injected high frequency voltage signal is not as expected and will lead to resolver offset detection error. The inverter nonlinearity effect is shown in Eqs. (5) and (6):

$$V_{dead} = \frac{T_{dead} + T_{on} - T_{off}}{T} \cdot (V_{dc} - V_{sat} + V_d) + \frac{V_{sat} + V_d}{2} \quad (5)$$

where $T_{dead}$, $T_{on}$, $T_{off}$, and $T_s$ represent the deadtime, turn-on delay time, turn-off delay time, and pulse width modulation period, respectively, $V_{dc}$ is the DC-bus voltage, $V_{sat}$ is the on-state voltage drop of the switch, and $V_d$ is the forward voltage drop of the diode.

$$\begin{bmatrix} V_{d,dead}^{e} \\ V_{q,dead}^{e} \end{bmatrix} = V_{dead} \cdot \frac{2}{3} \begin{bmatrix} \cos(\theta_e)\cos\left(\theta_e - \frac{2\pi}{3}\right)\cos\left(\theta_e + \frac{2\pi}{3}\right) \\ \sin(\theta_e)\sin\left(\theta_e - \frac{2\pi}{3}\right)\sin\left(\theta_e + \frac{2\pi}{3}\right) \end{bmatrix} \begin{bmatrix} \text{sign}(i_a) \\ \text{sign}(i_b) \\ \text{sign}(i_c) \end{bmatrix} \quad (6)$$

where $V_{d,dead}^{e}$ and $V_{q,dead}^{e}$ respectively represent the d-axis and q-axis deadtime voltage in the synchronous reference frame, and $i_a$, $i_b$, and $i_c$ respectively represent the phase-A, phase-B, and phase-C current. Among all factors, the inverter deadtime is typically the dominant factor.

Figure 3:
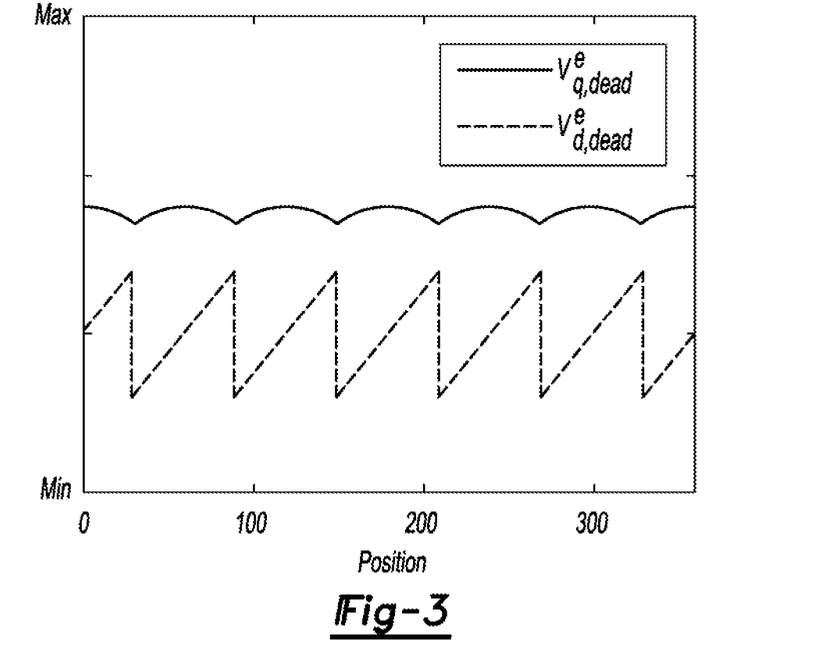
FIG. 3 is a d-axis/q-axis plot of deadtime voltage as a function of angular position for a given DC-bus voltage.

FIG. 3 shows the deadtime voltage on the d-axis and q-axis of the synchronous reference frame as a function of angular position at one particular DC-bus voltage. The inverter deadtime has different influence on the d-axis as compared with the q-axis, and shows a six order pattern in one electric cycle.

Figure 4:
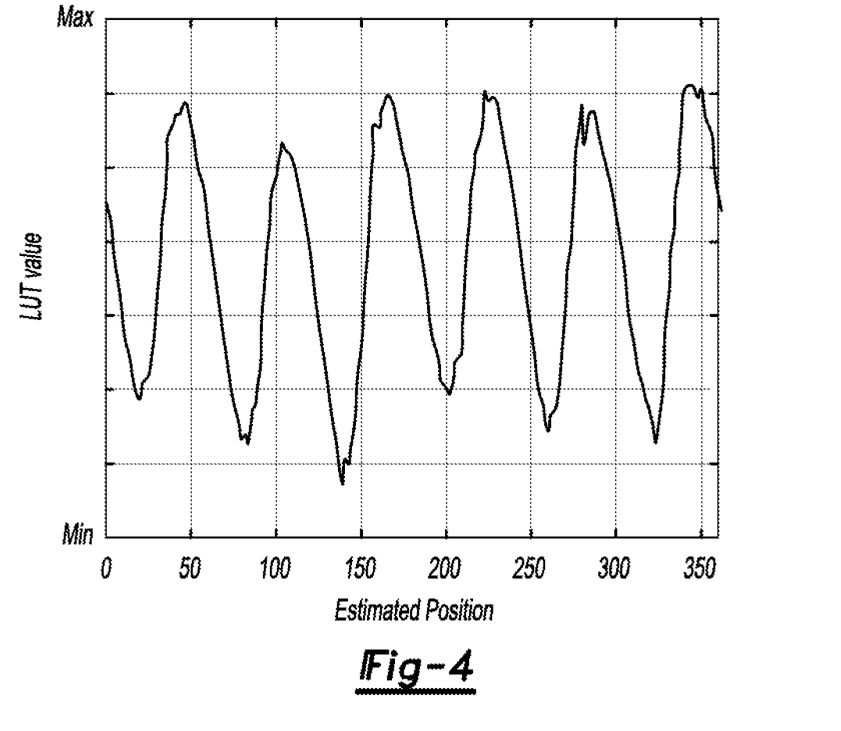
FIG. 4 is a plot of a compensation example look-up table for resolver offset detection.

To compensate for the influence of the inverter deadtime and improve resolver offset detection accuracy, a look-up table can be utilized to compensate for the error. FIG. 4 shows an example of such look-up table resolver offset detection. Using the look-up table, the accuracy of the resolver offset detection is achieved for one particular DC-bus or battery voltage. The deadtime voltage, however, is also a function of the DC-bus voltage, so additional action is needed to improve resolver offset detection accuracy at various DC-bus voltages.

To achieve this, a constant duty ratio can be used. When the DC-bus voltage changes from $V_{dc1}$ to $V_{dc2}$, the algorithm also changes the magnitude of the injected high frequency voltage signal from $V_{c1}$ to $V_{c2}$ to keep the duty ratio constant, as shown in Eq. (7):

$$\frac{V_{dc1}}{V_{c1}} = \frac{V_{dc2}}{V_{c2}} \qquad (7)$$

In such a manner, the phase lag of actual high frequency voltage output signals is fixed regardless of DC-bus voltage variation, and the look-up table mentioned above is able to compensate for the inverter deadtime effect under varying DC-bus voltage conditions.

Figure 5:
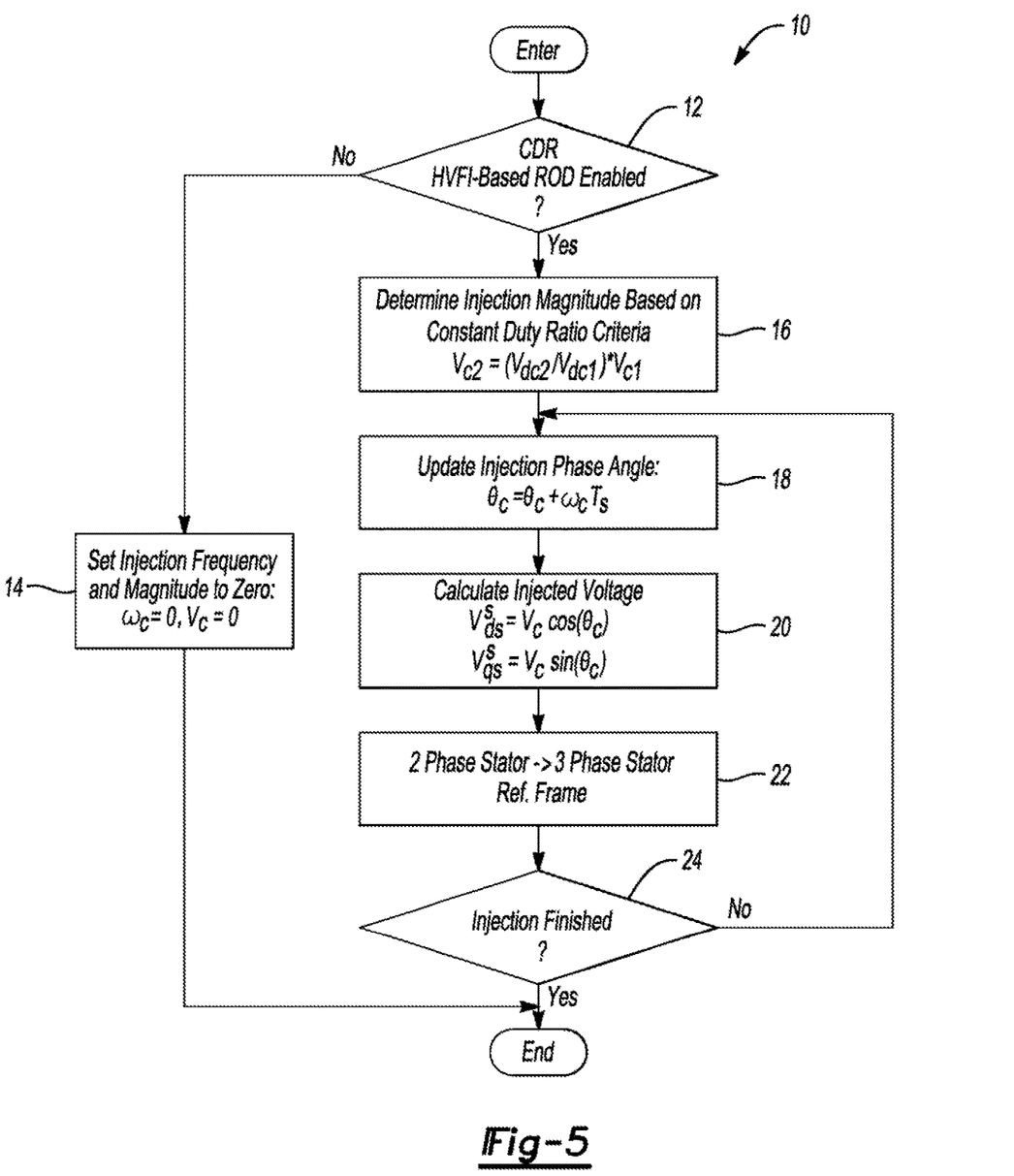
FIG. 5 is a flow chart of an injection routine.

FIG. 5 shows an algorithm 10 for an injection routine associated with the techniques proposed herein. At operation 14, it is determined whether constant duty ratio high frequency voltage injection-based resolver offset detection is enabled. If no, the injection frequency, $\omega_c$, and magnitude $V_c$, are set to zero at operation 14. The algorithm 10 then ends. If yes, the adjusted injection magnitude, $V_{c2}$, is determined according to the relation shown (see also Eq. (7)). At operation 18, the injection angle $\theta_c$ is updated according to the relation shown, where $T_s$ is the sampling period. The injection voltage, $V_{ds}^s$, $V_{qs}^s$, is then calculated at operation 20 according to the relation shown. At operation 22, the two-phase stator reference frame is transformed to the three-phase stator reference frame using standard techniques. And at operation 24, it is determined whether the injection is finished. If no, the algorithm 10 returns to operation 18. If yes, the algorithm 10 ends.

Figure 6:
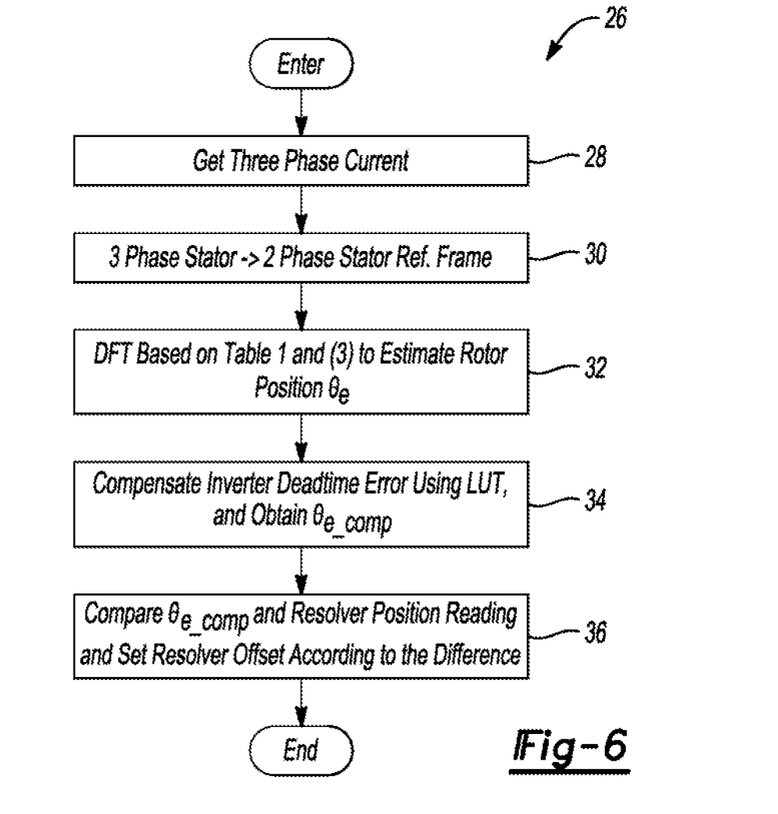
FIG. 6 is a flow chart of a detection routine.

FIG. 6 shows an algorithm 26 for a detection routine associated with the techniques proposed herein. At operation 28, the three-phase currents are obtained. The three-phase stator reference frame is transformed to the two-phase stator reference frame using standard techniques at operation 30. Rotor position $\theta_e$ is then estimated from Eqs. (3) and (4) at operation 32. At operation 34, the look-up table described above is used to compensate for the inverter deadtime error and obtain compensated rotor position, $\theta_{e\_comp}$. At operation 36, the compensated rotor position is compared with the resolver position reading, and the resolver offset is set according to the difference. The algorithm 26 then ends.

In a vehicle, it may be desirable to use a position sensor offset detection algorithm that can work at zero electric machine speed, and generate zero torque, so the vehicle driver will not feel the existence of a power up offset detection.

Position Reading Remapping

Figure 7:
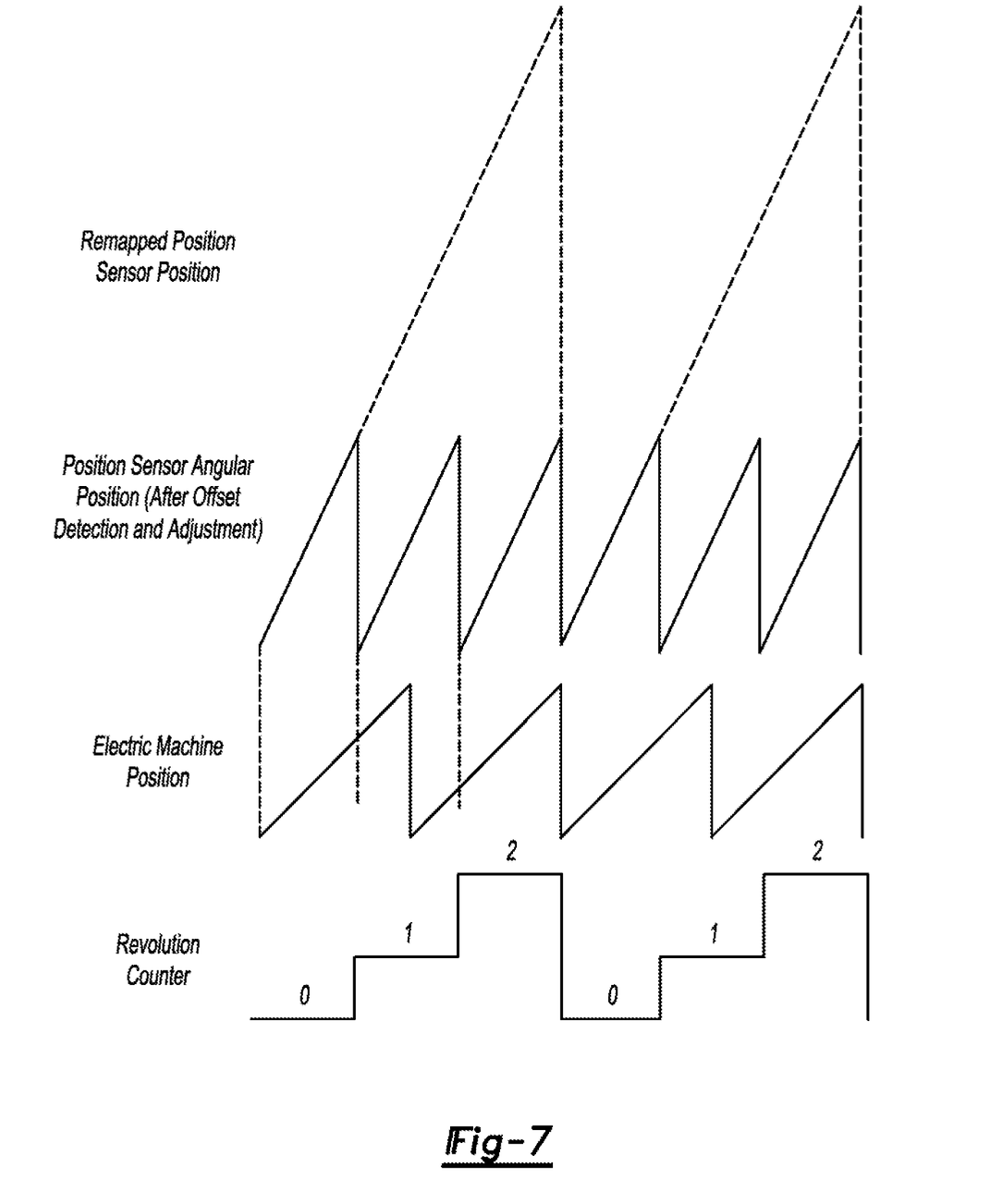
FIG. 7 shows angular position waveforms versus time for a position sensor with six pole pairs and a rotor of an electric machine with for pole pairs, as well as a revolution counter waveform and remapped position sensor waveform.

With regard to the second issue, an additional revolution counter to remap the position sensor reading to the correct electric machine position is created. For example, under positive rotational speed, a conventional position sensor angular position will typically wrap back to 0 after reaching the maximum value, and count up again from 0 for the next revolution. Here, an additional revolution counter is added. Using a position sensor with an NPP of six and an electric machine with an NPP of four as an example, the additional revolution counter will count from 0, 1, 2 for positive rotation, and 0, −1, −2 for negative rotation. The angular position reading will only wrap back to 0 when it finishes a revolution at revolution counter equal to ±2. FIG. 7 shows an example of a position sensor angular position remapping method for a six NPP position sensor and a four NPP electric machine. The dashed line is the remapped angular position reading As apparent to those of ordinary skill, the unique mapping from position sensor position to electric machine position is restored.

As a general case, with any position sensor NPP, M, and electric machine NPP, N, the counting range for the additional revolution counter is determined by Eq. (8). Assuming the minimum common multiplier of M and N is L, the revolution counter range is $$[-(L/N)+1, -(L/N)+2, \ldots, 0, \ldots, (L/N)-2, (L/N)-1] \qquad (8)$$

Assuming the range for the original position sensor reading is 0 to X, where X is the maximum reading of the original position sensor, with any position sensor NPP, M, and electric machine NPP, N, the ranges of original position sensor reading, remapped position reading, and scaled position reading are listed in Table II.

TABLE 1

General Case

| | Original position sensor reading | Remapped position sensor reading | Scaled position sensor reading |
|---|---|---|---|
| Range | 0 to X | 0 to X * (L/N) | [0 to X * (L/N)] *N/M = 0 to X * L/M |

If, for example, M is equal to six and N is equal to four, the ranges of original position sensor reading, remapped position reading, and scaled position reading are shown in Table II.

Table II Example if M = 6, N = 4

| | Original position sensor reading | Remapped position sensor reading | Scaled position sensor reading |
|---|---|---|---|
| Range | 0 to X | 0 to 3X | 0 to 2X |

The scaled position sensor reading matches L/M electrical revolutions of the electric machine. For example, if M is equal to six and N is equal to four, the scaled position sensor reading in the range of 0 to 2X reflects 2 electrical revolutions of the electric machine. Optionally, the scaled position sensor reading can wrap-around within the range of 0 to X. Additionally, when M is greater than N, using the proposed techniques could increase the equivalent resolution of the position sensor by M/N.

Figure 8:
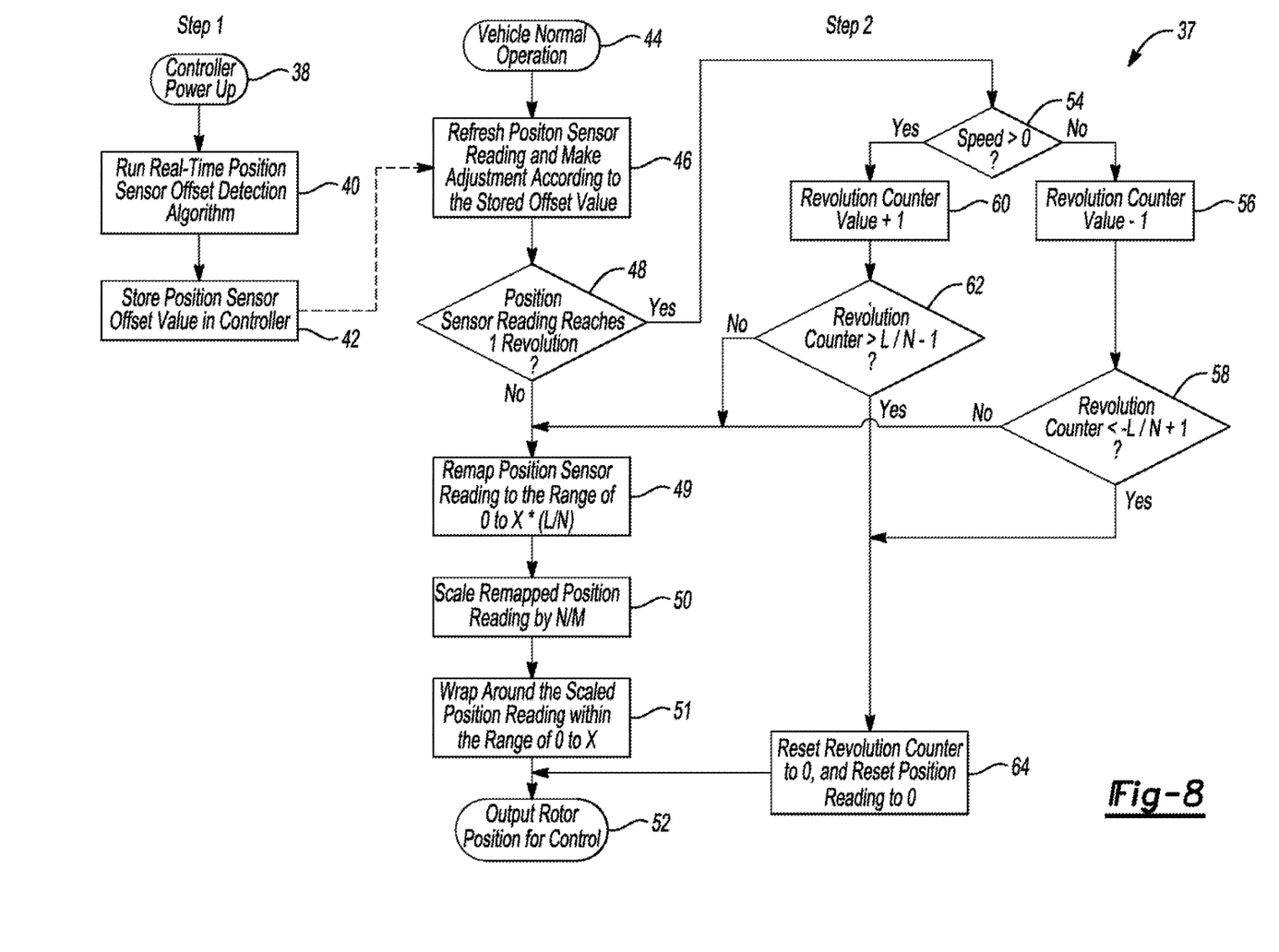
FIG. 8 is a flow chart of an algorithm for detection and control of an electric machine with any combination of position sensor pole pairs and electric machine pole pairs.

FIG. 8 illustrates an algorithm 37 that can be performed to implement the strategies described herein. At operation 38, controller power up is performed, and a real-time position sensor offset detection algorithm is run at operation 40, such as those described above. At operation 44, normal vehicle operation is achieved, and a position sensor reading is refreshed and adjustments are made according to the stored offset value at operation 46 as known in the art.

At decision block 48, it is determined whether the position sensor reading has reached one revolution. If no, the position sensor reading is remapped to the range of 0 to X*(L/N) at operation 49. At operation 50, the remapped position reading is scaled by N/M. The scaled position reading can then optionally be wrapped around within the range 0 to X at operation 51, and the rotor position is output for control at operation 52.

Returning to decision block 48, if yes, it is determined whether electric machine speed is greater than zero at decision block 54. A typical wheel position or speed sensor, or other appropriate sensor can be used for such a determination. If no, one is subtracted from the revolution counter at operation 56. At decision block 58, it is determined whether the revolution counter has a value less than the quantity L/N plus 1. If no, the algorithm 37 proceeds to operation 49. If yes, the revolution counter and position reading are both reset to zero at operation 64. The algorithm 37 then proceeds to operation 52.

Returning to decision block 54, if yes, one is added to the revolution counter at operation 60. At decision block 62, it is determined whether the revolution counter has a value greater than L/N minus one. If no, the algorithm 37 proceeds to operation 49. If yes, the algorithm 37 proceeds to operation 64.

Figure 9:
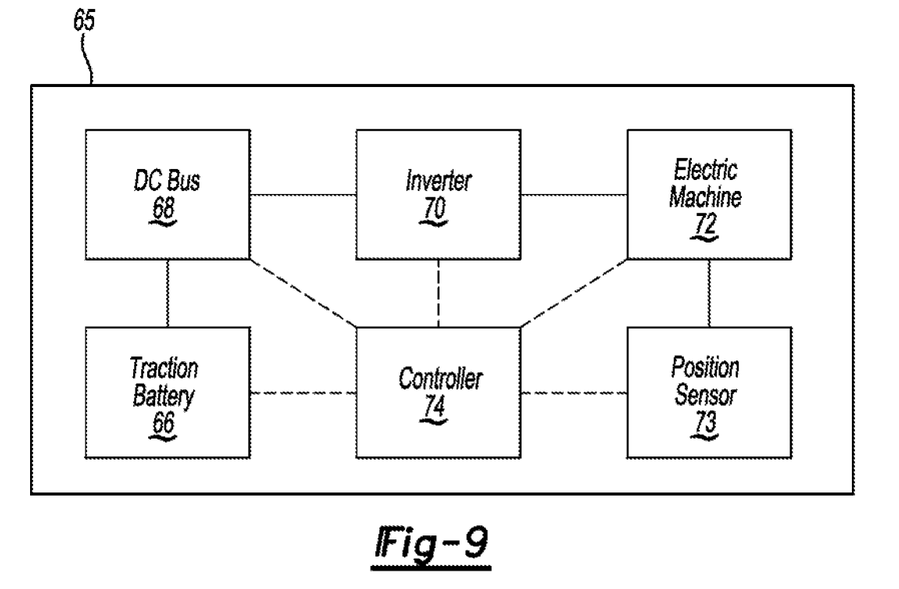
FIG. 9 is a block diagram of a vehicle.

FIG. 9 is a simplified block diagram of a vehicle 65 that includes, among other things, a traction battery 66, a DC bus 68, an inverter 70, an electric machine 72, a position sensor 73 (resolver), and one or more controllers 74. Power from the traction battery 66 can be provided to the electric machine 72 via the DC bus 68 and inverter 70 as known in the art. Power can also flow in the other direction. The one or more controllers 74 may implement the techniques contemplated herein to exercise control over the traction battery 66, inverter 70, and electric machine 72. The one or more controllers 74, for example, may operate the electric machine 72 (e.g., provide it commands to produce a specified torque or speed as known in the art) based on rotor position information derived from the position sensor 73 and the algorithm 37.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine having a number of pole pairs, N;
   a position sensor having a number of pole pairs, M, and configured to generate output indicative of a rotational position of the electric machine, wherein M is not equal to and not a factor of N; and
   one or more controllers configured to
      generate a remapped rotational position according to a product of the rotational position and L/N, to generate a scaled position according to a product of the remapped rotational position and N/M, and command the electric machine to produce a specified torque or speed based on the scaled position, wherein L is a minimum common multiplier of N and M,
      generate a count based on the output, wherein the count has a range between $(-L/N)+1$ and $(L/N)-1$, and
      responsive to (i) a speed of the electric machine being greater than zero and (ii) the count plus one being greater than $(L/N)-1$, reset the count to zero and reset the rotational position to zero.

2. The vehicle of claim 1, wherein the one or more controller are further configured to, responsive to the rotational position achieving one revolution, determine the speed.

3. The vehicle of claim 1, wherein the one or more controllers are further configured to, responsive to (i) a speed of the electric machine not being greater than zero and (ii) the count minus one being less than $(-L/N)+1$, reset the count to zero and reset the rotational position to zero.

4. The vehicle of claim 3, wherein the one or more controller are further configured to, responsive to the rotational position achieving one revolution, determine the speed.

5. The vehicle of claim 1, wherein M is greater than N.

6. A method for operating an electric machine of a vehicle, the method comprising:
   by one or more controllers,
      obtaining a rotational position of an electric machine having a number of pole pairs, N, from a position sensor having a number of pole pairs, M,
      generating a remapped rotational position according to a product of the rotational position and L/N, wherein L is a minimum common multiplier of N and M,
      generating a scaled position according to a product of the remapped rotational position and N/M,
      commanding the electric machine to produce a specified torque or speed based on the scaled position,
      generating a count based on rotational position, wherein the count has a range between $(-L/N)+1$ and $(L/N)-1$, and
      responsive to (i) a speed of the electric machine not being greater than zero and (ii) the count minus one being less than $(-L/N)+1$, resetting the count to zero and resetting the rotational position to zero.

7. The method of claim 6 further comprising, responsive to (i) a speed of the electric machine being greater than zero and (ii) the count plus one being greater than $(L/N)-1$, resetting the count to zero and resetting the rotational position to zero.

8. The method of claim 7 further comprising, responsive to the rotational position achieving one revolution, determining the speed.

9. The method of claim 6 further comprising, responsive to the rotational position achieving one revolution, determining the speed.

10. The method of claim 6, wherein M is not equal to and not a factor of N.

\* \* \* \* \*